United States Patent
Alperovich et al.

(12)
(10) Patent No.: US 6,249,676 B1
(45) Date of Patent: Jun. 19, 2001

(54) SYSTEM AND METHOD FOR CALL OPTIMIZATION BETWEEN MOBILE TERMINALS IN A SATELLITE NETWORK

(75) Inventors: Vladimir Alperovich, Dallas; Eric Valentine, Plano, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/048,684

(22) Filed: Mar. 26, 1998

(51) Int. Cl.[7] .................................................. H04Q 7/20
(52) U.S. Cl. ..................... 455/427; 455/38.1; 455/62; 455/428; 455/433; 455/512
(58) Field of Search .................................. 455/414, 445, 455/427, 428, 433, 9, 12.1, 62, 98, 512, 527, 429, 430, 435, 461, 466, 517, 519, 560, 38.1

(56) References Cited

U.S. PATENT DOCUMENTS 5,918,177 * 6/1999 Corriveau et al. .................... 455/432
5,991,621 * 11/1999 Alperovich et al. .................. 455/433
6,064,882 * 5/2000 Coyne et al. .......................... 455/428
6,067,452 * 5/2000 Alexander ............................. 455/428

* cited by examiner

Primary Examiner—Lee Nguyen
Assistant Examiner—Simon Nguyen
(74) Attorney, Agent, or Firm—Jenkens & Gilchrist, P.C.

(57) ABSTRACT

A telecommunications system and method is disclosed for restricting optimization of calls between mobile terminals within a satellite network to allow implementation of supplementary services. Either the network operator or the mobile subscriber can decide whether supplementary services or optimization of calls between mobile subscribers in a satellite network has priority. For instance, prior to placing a call, the mobile subscriber can enter a service code on the mobile terminal indicating that the call should or should not be optimized, depending upon the default parameters of the service provider. Alternatively, the network operator can determine whether a conflict exists between optimization and supplementary services, and if one exists, forego optimization in favor of the supplementary services.

14 Claims, 8 Drawing Sheets

SYSTEM AND METHOD FOR CALL OPTIMIZATION BETWEEN MOBILE TERMINALS IN A SATELLITE NETWORK

BACKGROUND OF THE PRESENT INVENTION

Field of the Invention

The present invention relates generally to telecommunications systems and methods for call management within a satellite network, and specifically to restricting optimization of calls between mobile subscribers within a satellite network to enable mobile subscribers to utilize supplementary services, such as call waiting, multi-party calling, call transferring, and Short Message Service.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 205, as shown in FIG. 2 of the drawings, a system of geostationary satellites 200 in orbit are used to provide communication between Mobile Stations (MS) 210 and a satellite-adapted Base Station System (SBSS) 220, which is connected to an integrated Mobile Switching Center/Visitor Location Register (MSC/VLR) 240. The MS 210 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the Mobile Stations 210. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Since the distances within the area served by the satellite(s) 200 are typically very large, the costs for these circuits can be enormous. In particular, the costs can be considerable if the circuits must cross remote areas or oceans.

Therefore, calls within a geostationary satellite network can be optimized so that a subscriber is reallocated to the MSC/VLR which is the most optimal for a given call, for example, for calls to another MS within the satellite network, the called MS typically re-registers in the MSC/VLR of the calling party. In this way, it is possible to make the connection directly over the satellite, avoiding the additional delay due to a double satellite-hop, by performing the connection for these calls within the satellite, e.g., only one bi-directional path is required (MS-satellite-MS) instead of two (MS-satellite-SBSS-satellite-MS). However, when a MS to MS call is optimized, many services provided by the network operator and purchased by the mobile subscriber, such as call waiting, call transfer, multi-party calling, and Short Message Service (SMS) do not function correctly, if at all.

It is, therefore, an object of the present invention to restrict optimization of calls between mobile subscribers within a satellite network to allow supplementary services available to the mobile subscriber, such as call waiting, call transfer, multi-party calling, and Short Message Service to work properly.

It is a further object of the present invention to allow network providers to selectively optimize calls between mobile subscribers within a satellite network to enable implementation of supplementary services.

It is still a further object of the present invention to allow mobile subscribers to indicate whether optimization of a satellite call to another mobile terminal or implementation of supplementary services is preferred.

SUMMARY OF THE INVENTION

The present invention is directed to telecommunications systems and methods for restricting optimization of calls between mobile terminals within a satellite network to allow implementation of supplementary services. Either the network operators or the mobile subscriber can decide whether supplementary services or optimization of calls between mobile subscribers in a satellite network has priority. For instance, prior to placing a call, the mobile subscriber can enter a service code on the mobile terminal indicating that the call should or should not be optimized, depending upon the default parameters of the service provider. Alternatively, the mobile subscriber could establish a list of telephone numbers associated with mobile terminals, which, if dialed, should and/or should not be optimized. Furthermore, the network operator can determine whether a conflict exists between optimization and supplementary services, and if one exists, forego optimization in favor of the supplementary services. Alternatively, if the calling and called party's have optimization priority indicators associated with their subscriber data stored in the Home Location Register, the network operator can optimize calls between the calling and called party even if a conflict with supplementary services exists.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
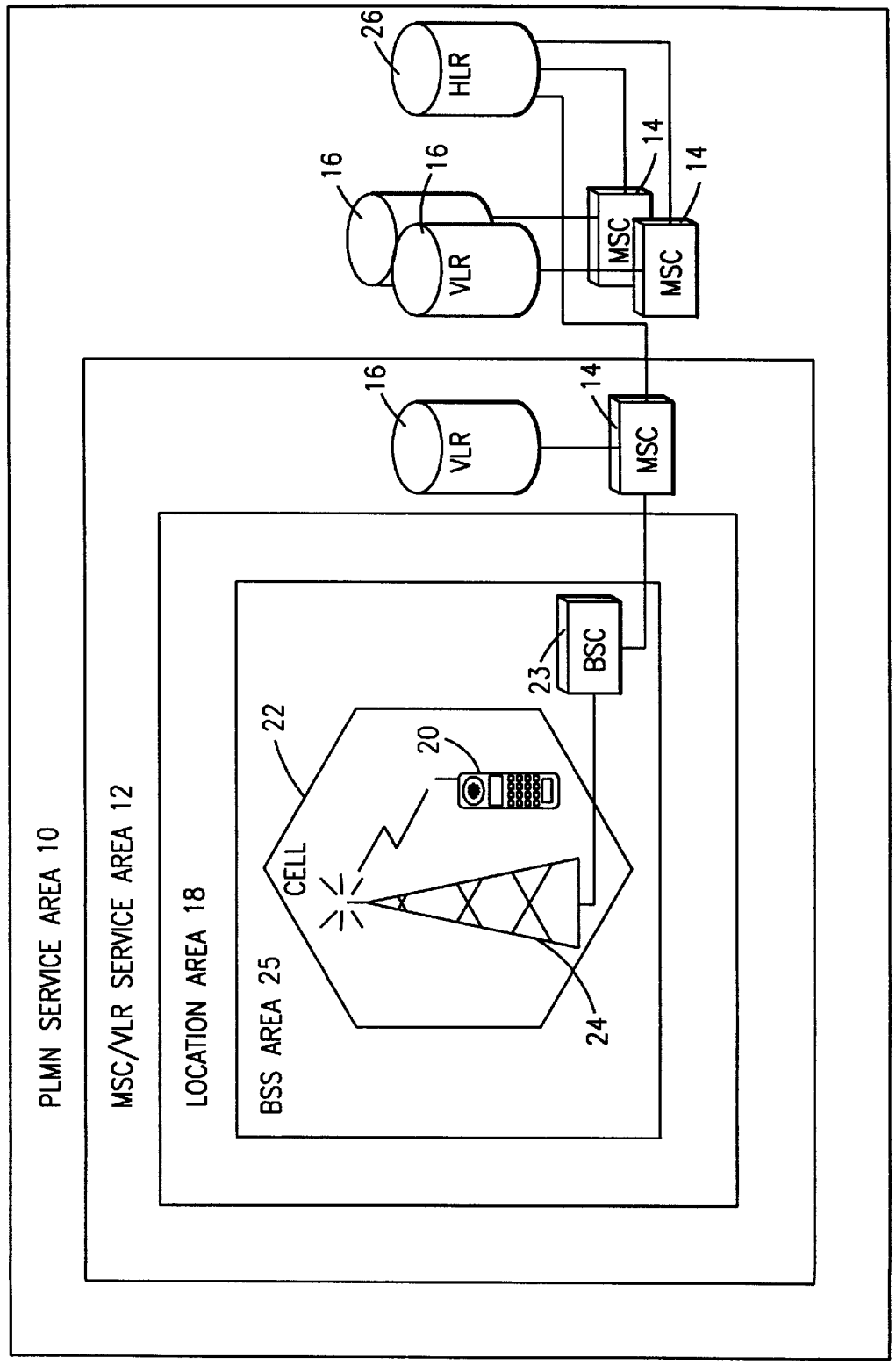
FIG. 1 is a is a block diagram of a conventional terrestrially-based wireless telecommunications system.
Figure 2:
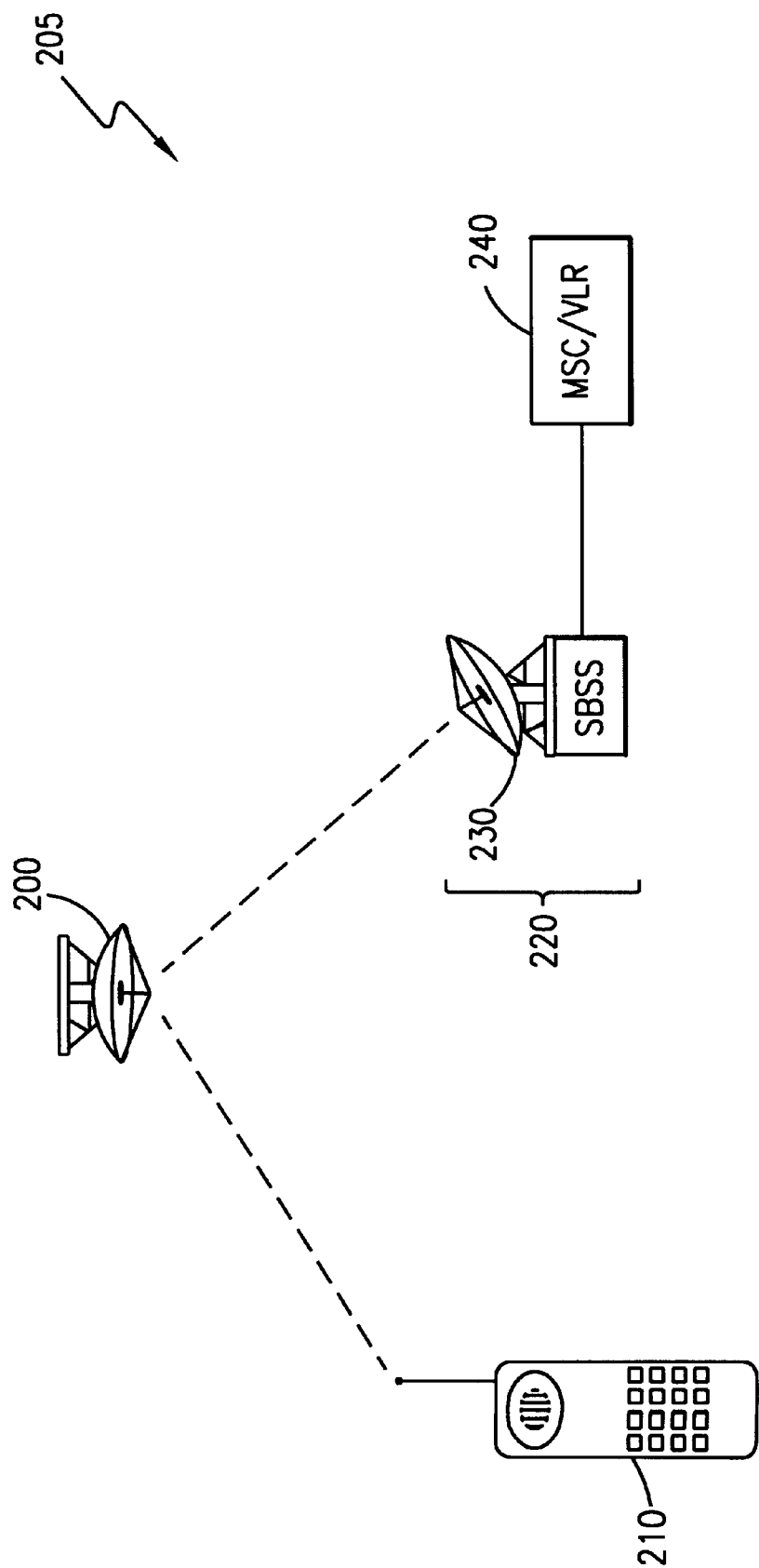
FIG. 2 is a block diagram illustrating aspects of a sample satellite-based network.
Figure 3:
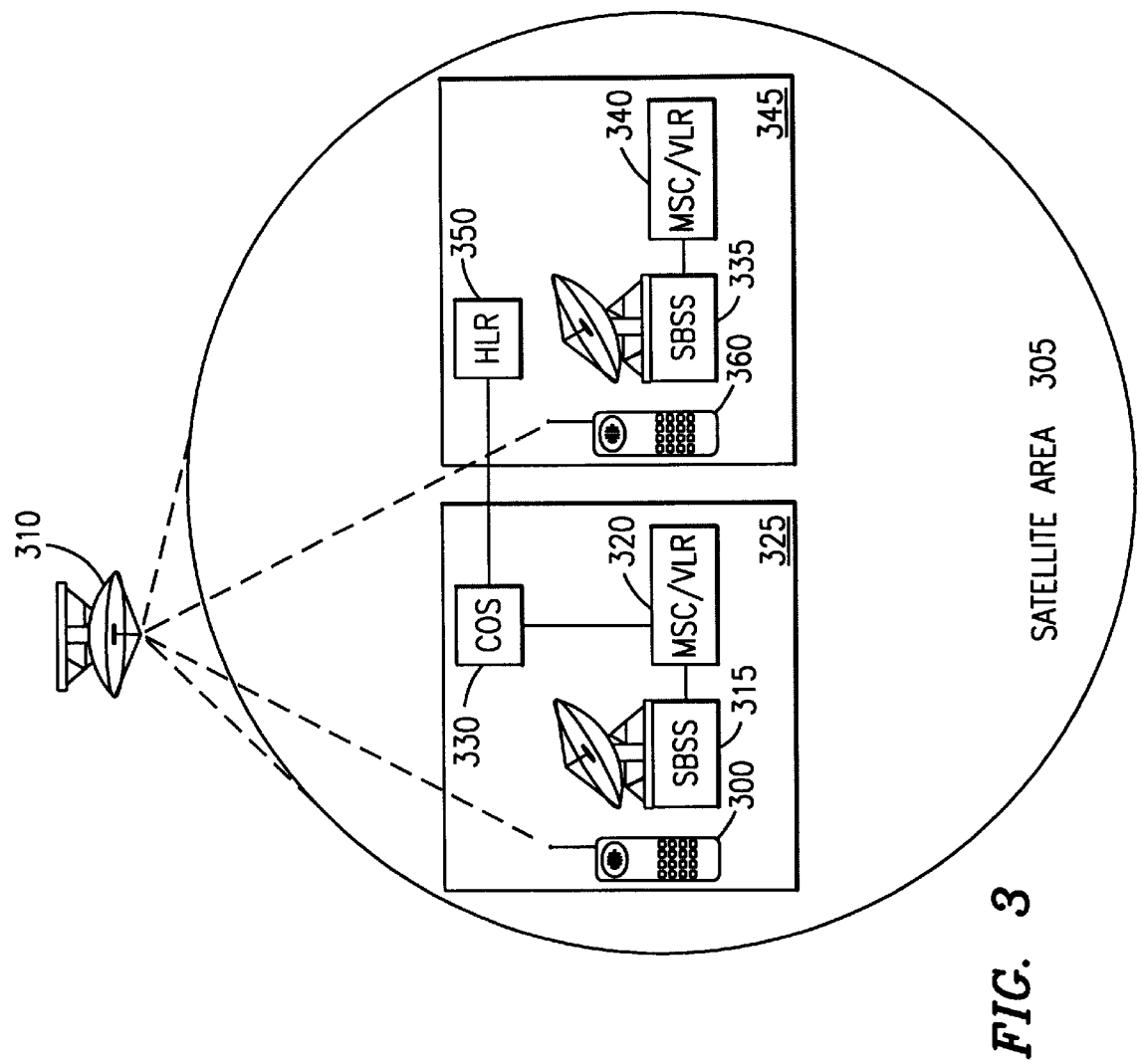
FIG. 3 is a block diagram illustrating call optimization within a satellite network for a mobile terminal to mobile terminal call.

With reference now to FIG. 3 of the drawings, when a Mobile Station (MS) 300 calls another MS 360 within the area 405 visible to a satellite 310, after a satellite-adapted Base Station System (SBSS) 315 serving the area 325 that the calling MS 300 is located in receives the Called Party Number (CPN) and sends it to a serving Mobile Switching Center/Visitor Location Register (MSC/VLR) 320, which determines that the CPN is not a number registered within the serving MSC/VLR 320, the digit string for the CPN is sent to a Call Optimization Server (COS) 330 for pre-analysis. The COS 330 can then determine that this is a MS 300 to MS 360 call, query a Home Location Register (HLR) 350 for the current location of the called (target) MS 360, and assign a transaction identifier to be used for making the connection between the two MSs (300 and 360).

Thereafter, the COS 330 can send an Unstructured Supplementary Service Data (USSD) string to the target MS 360 via the satellite 310, an SBSS 335 serving the current area 345 that the target MS 360 is located in and a serving MSC/VLR 340, requesting the target MS 360 to re-register itself on the MSC/VLR 320 where the call originated. The target MS 360 is also given the transaction identifier. In this way, satellite resources can be conserved by performing the connection for these calls within the satellite 310, e.g., only one bi-directional path is required (MS-satellite-MS) instead of two (MS-satellite-SBSS-satellite-MS).

After re-registration in the desired MSC/VLR 320, normal call setup procedures take place, with the addition of an indicator that this is a MS 300 to MS 360 call and the inclusion of the transaction identifier. The MS 300 to MS 360 call indicator is used to disable functions requiring terrestrial switch connections. The transaction identifier is used when channel assignments are done and the connection is made to ensure that the right channels can be connected in the satellite 310. Once the connection is made in the satellite 310, the transaction identifier can be released. If the call from the calling MS 300 is to a called MS 360 within an area visible to a different satellite (not shown) than the calling MS 300 or to no satellite, satellite call optimization does not apply, and conventional methods are used to connect the call, as is well known in the art.

Figure 4:
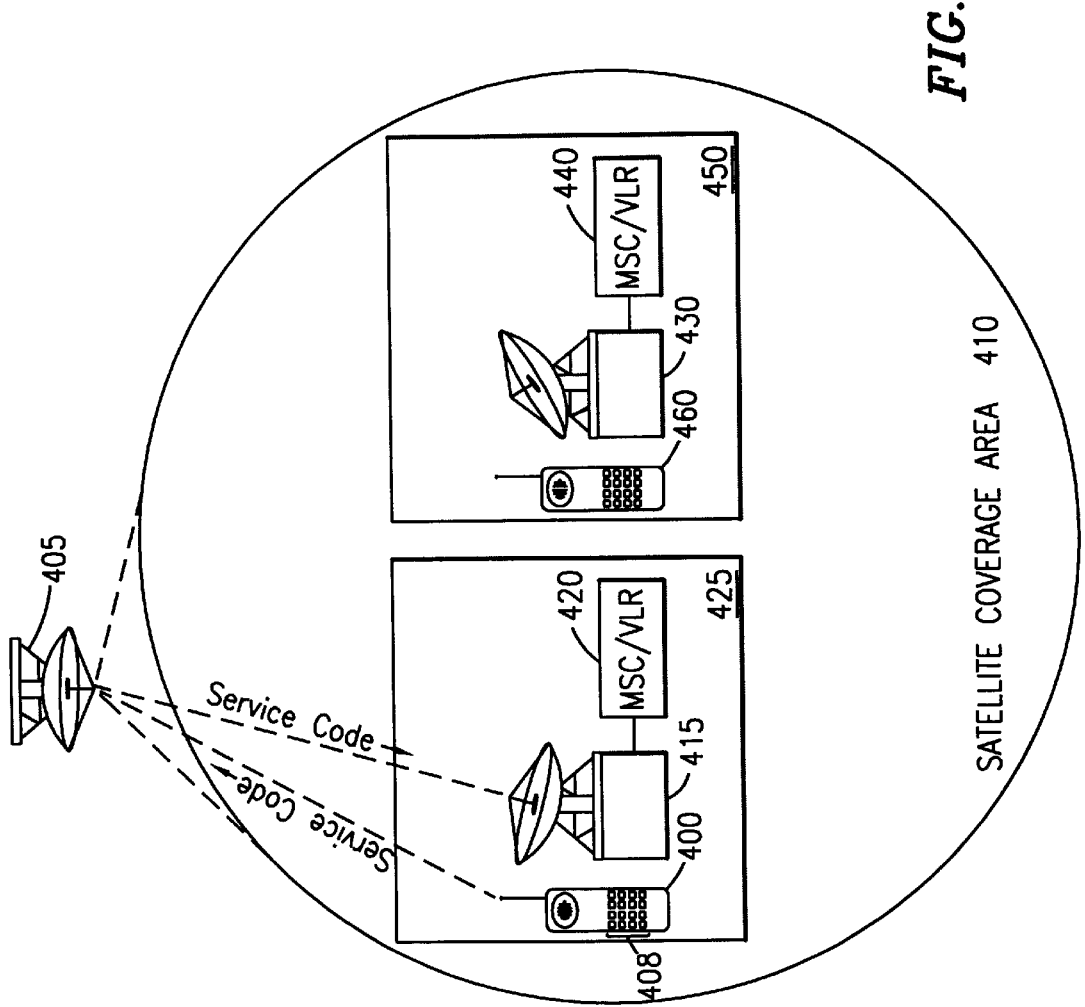
FIG. 4 illustrates selection of optimization or supplementary services by a mobile subscriber prior to placing a call to another mobile terminal.

However, when a MS 300 to MS 360 call is optimized in the aforementioned manner, many supplementary services available to both the calling MS 300 and the called MS 360, including, but not limited to call waiting, call transferring, multi-party calling, and Short Message Service (SMS) are not available or do not work in some cases. Therefore, as shown in FIG. 4 of the drawings, and in accordance with one preferred embodiment of the present invention, prior to placing a call to another MS 460 within the satellite coverage area 410, the calling mobile subscriber can enter a service code on a keypad 408 of the MS 400, indicating that the call should or should not be optimized, depending upon the default parameters of the service provider (always optimize or never optimize). This service code is sent to the MSC/VLR 420 serving the area 425 the MS 400 is located in via the satellite 405 and the serving SBSS 415, using, for example, an Unstructured Supplementary Service Data (USSD) message.

Thereafter, if optimization is selected, the MSC/VLR 440 serving the area 450 that the called MS 460 is located in sends a message to the called MS 460 via the satellite 405 and the serving SBSS 430 instructing the called MS to re-register on the MSC/VLR 420 serving the area 425 that the calling MS 400 is located in. In addition, in preferred embodiments of the present invention, when optimization is selected, the called MS 460 will receive a message with the ringing of the call indicating that the calling MS 400 has requested optimization. Therefore, the called MS 460 then has the option of not answering the call if the called MS 460 does not wish to have its supplementary services disabled. Advantageously, if the calling MS has entered the service code for optimization of the MS 400 to MS 460 call, the cost of the call to the calling party is reduced.

Figure 5:
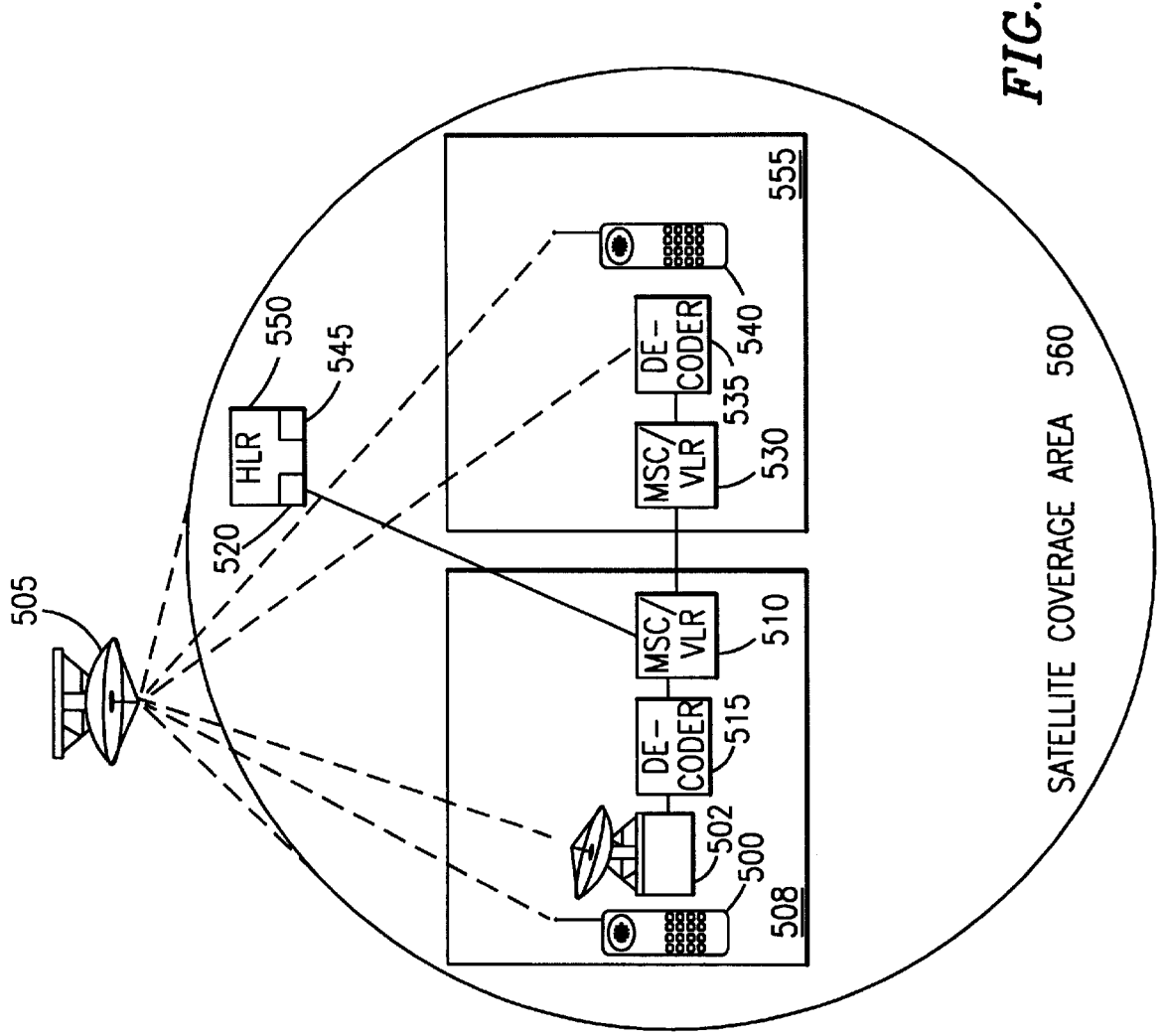
FIG. 5 shows the cancellation of optimization of a mobile terminal to mobile terminal call by the cellular network if a conflict between optimization and supplementary services exists.

In an alternative embodiment, as shown in FIG. 5 of the drawings, the calling MS 500 does not enter a service code prior to placing a call to another MS 540 within the satellite coverage area 560. Instead, the call is optimized as described hereinbefore, but during call set-up, the supplementary services 520 of the calling party sent by the HLR 550 are checked by the MSC/VLR 510 serving the area 508 that the calling MS 500 is located in. If there are supplementary services 520 in conflict with the bi-directional path connection (MS-satellite-MS), switching the connection on the satellite 505 is disabled, and the call is routed via the two-directional path connection. Thus, the connection goes from the calling MS 500, through the satellite 505, to a decoder 515 and the MSC/VLR 510 serving the calling MS 500, then to the MSC/VLR 530 serving the area 555 that the called MS 540 is located in and an additional respective decoder 535, through the satellite 505 once again, and finally to the called MS 540. Alternatively, a double satellite-hop connection can be established, which requires the called MS 540 to re-register with the MSC/VLR 510 serving the calling MS 500. The double satellite-hop goes from the calling MS 500 to the satellite 505, to the SBSS 502 for the calling MS 500 to the satellite 505 and finally to the called MS 540. In addition, if the calling subscriber does not have any supplementary services 520 associated with it that conflict with the call optimization process, and the call is optimized, the called MS 540 will receive a message with the ringing of the call indicating that the call will be optimized. This will allow the called MS 540 the option of not answering the call if the called MS 540 has supplementary services 545 which would conflict with the call optimization process. Therefore, by restricting the call optimization process when supplementary services associated with the calling MS 500 conflict with optimization, interference with supplementary subscriber services 520 and 545 can be minimized.

Figure 6:
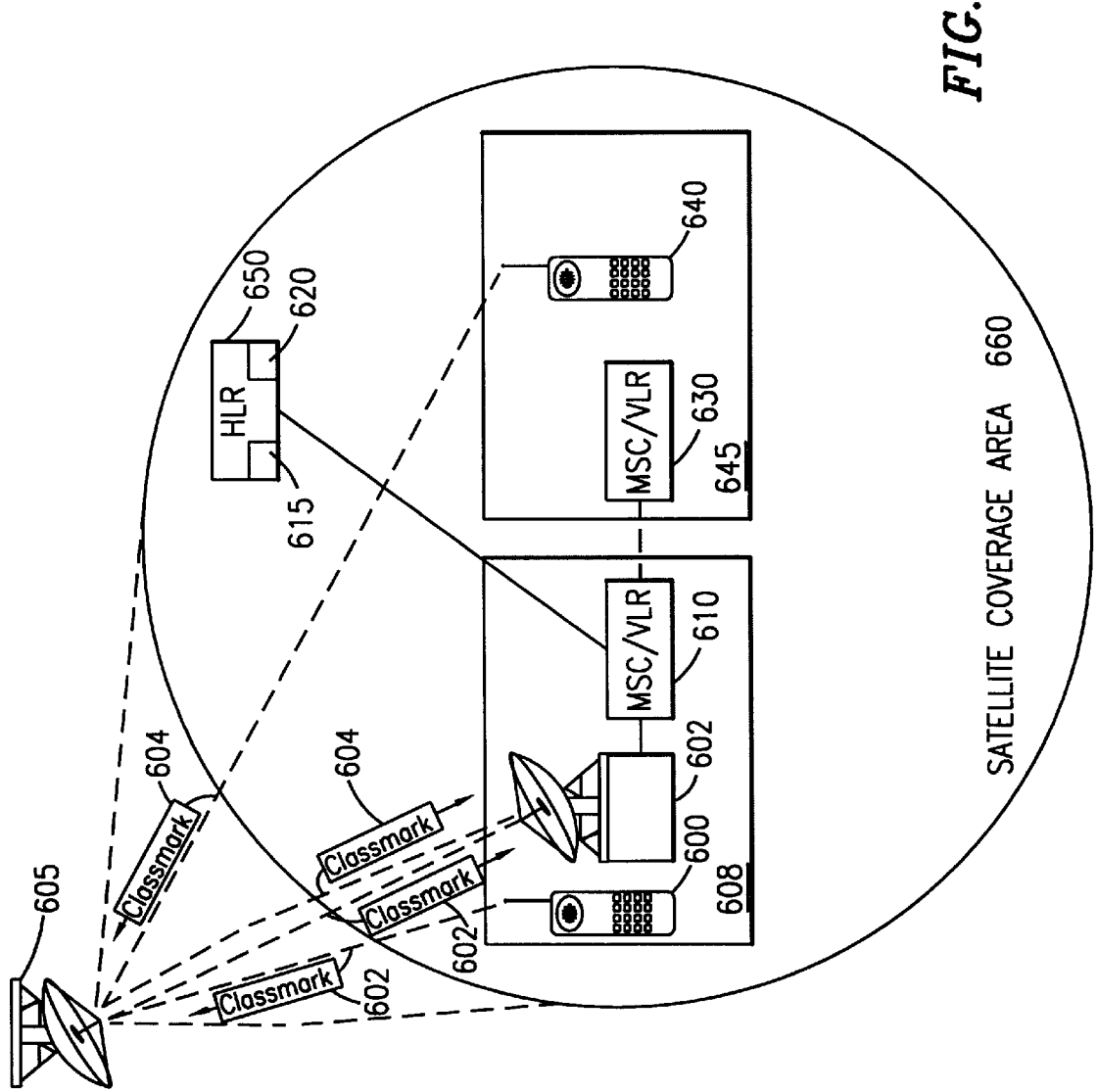
FIG. 6 describes the inclusion of a priority indicator in the subscriber data associated with the calling and called mobile subscribers which allows optimization even if a conflict with supplementary services exists.

Alternatively, instead of disabling the bi-directional path connection when a conflict with subscriber supplementary services exists, as shown in FIG. 6 of the drawings, a bi-directional MS-MS call priority indicator 615 and 620 associated with the subscriber data of both the calling MS 600 and the called MS 640, respectively, can be stored in the HLR 650, or an indication of the MS-MS call priority indicator can be included in the classmark information 602 and 604 sent from the calling MS 600 and the called MS 640, respectively, to the serving MSC/VLR 610. The classmark information 602 and 604 describes attributes of the MS 600 and 640, respectively, which is being used for a particular call. Examples of typical information included in the classmark information 602 and 604 are encryption capabilities, RF power level supported and short message capability. The subscription information in the MSC/VLR 610, which is obtained form the HLR 650, or the classmark information 602 and 604 can then be checked by the MSC/VLR 610 to determine optimization priority of the both the calling MS 600 and the called MS 640.

The priority indicators 615 and 620 allow a bi-directional MS-MS path connection on a per-subscriber basis, even if supplementary services conflict with the optimization. For example, a group of subscribers may desire to always have a bi-directional path connection in order to avoid the problems associated with multiple decoders and the delays associated with a two-directional path connection. The priority indicators 615 and 620 can be used to establish end-to-end compatibility, that is, the indication 615 and 620 for both the calling MS 600 and the called MS 640, respectively, are checked so that only if both the calling MS 600 and the called MS 640 have the priority indicator 615 and 620, respectively, set, would the bi-directional MS-MS path connection have priority.

Figure 7:
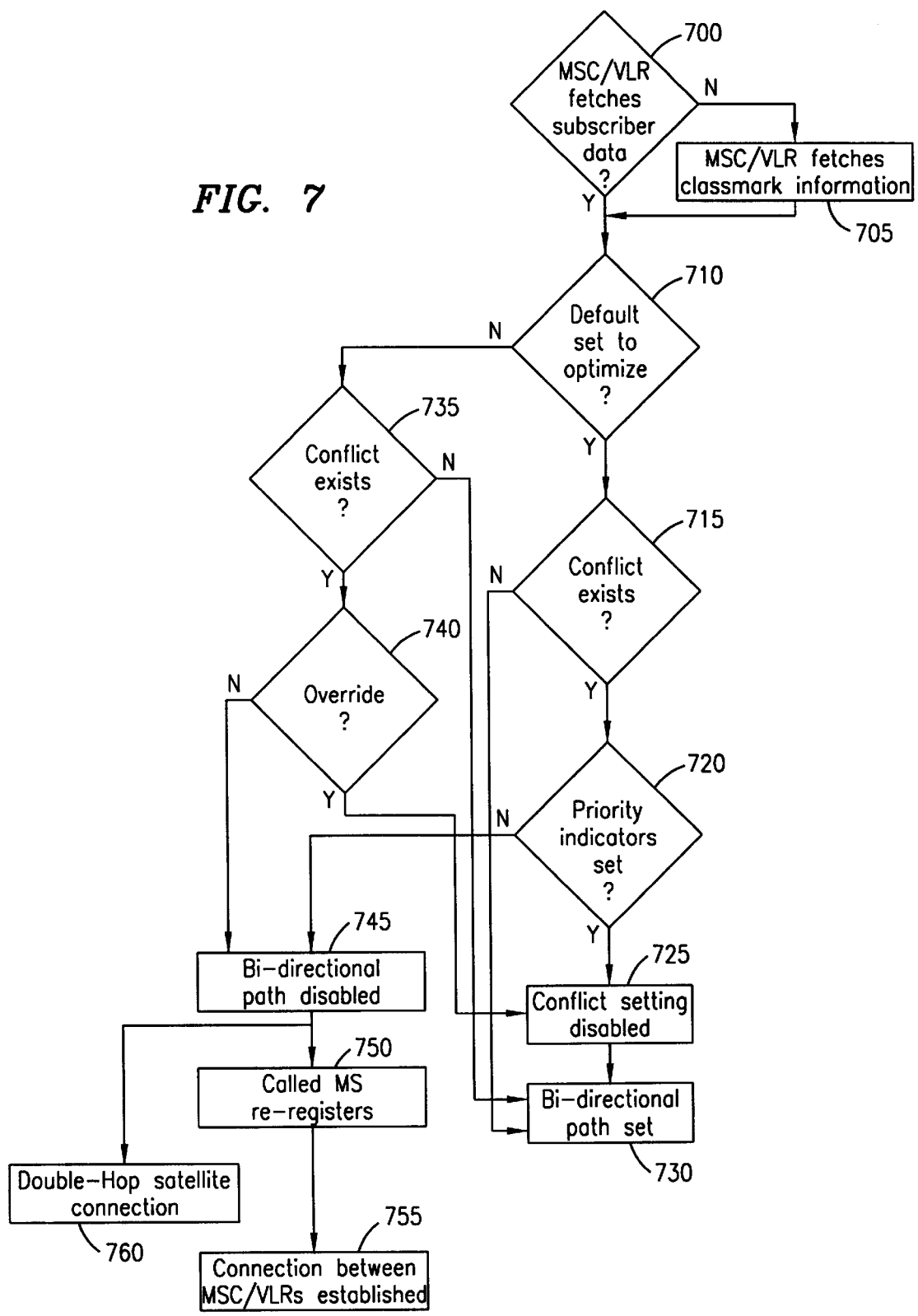
FIG. 7 is a flow chart illustrating the implementation of priority indicators in the calling and called mobile subscribers' subscriber data in order to allow optimization of a call when a conflict exists with supplementary services.

For example, as indicated in FIG. 7 of the drawings, which is discussed in connection with FIG. 6 of the drawings, once the called MS 640 has re-registered in the MSC/VLR 610 serving the area 608 the calling MS 600 is located in, the serving MSC/VLR 610 fetches, from the HLR 650, the subscriber data containing the supplementary services for the called MS 640 (step 700). Alternatively, the serving MSC/VLR 610 can fetch the classmark information 602 and 604 from the calling MS 600 and the called MS 640, respectively (step 705). If the default setting for the serving MSC/VLR 610 is to optimize (step 710), the serving MSC/VLR 610 then determines whether there is a conflict with the subscriber supplementary services for either the calling MS 600 or the called MS 640 (step 715). If such a conflict exists (step 715), the serving MSC/VLR 610 then checks the priority indicators 615 and 620 for both the calling MS 600 and the called MS 640, respectively (step 720), which are obtained from either the subscriber data or the classmark information 602 and 604. If the priority indicators 615 and 620 for both the calling MS 600 and the called MS 640, respectively, are set (step 720), the serving MSC/VLR 610 disables the conflict setting (step 725) and enables the MS-MS bi-directional path connection via the satellite 605 (step 730).

If the priority indicators 615 and 620 for the calling MS 600 and the called MS 640, respectively, are not set (step 720) and there is a conflict (step 715), the bi-directional path connection is disabled (step 745), the called MS 640 re-registers with the MSC/VLR 630 serving the area 645 the called MS 640 is in (step 750), and a connection is established between the MSC/VLR 610 serving the calling MS 600 and the MSC/VLR 630 serving the called MS 640 (step 755). It should be understood that if no conflict exists (step 715), then the bi-directional path connection is established (step 730).

However, if the default setting for the serving MSC/VLR 610 is to not optimize (step 710), the serving MSC/VLR 610 checks the supplementary services of both the calling MS 600 and the called MS 640 to determine if a conflict with the bi-directional path connection exists (step 735). If such a conflict does exist (step 735), the serving MSC/VLR 610 then determines whether there is an override in either the subscriber data or the classmark information 602 and 604 (step 740). If there is an override 602 and 604 (step 740), the conflict setting is disabled (step 725) and the bi-directional path connection between the calling MS 600 and the called MS 640 is enabled via the satellite 605 (step 730).

However, if there is not an override (step 740) and a conflict with supplementary services of either the calling MS 600 or the called MS 640 exists (step 735), the bi-directional path connection is not established (step 745), the called MS 640 re-registers with the MSC/VLR 630 within the satellite area 660 which serves the called MS 640 (step 750), and a connection is established between the MSC/VLR 610 serving the calling MS 600 and the MSC/VLR 630 serving the called MS 640 (step 755). Alternatively, the called MS 640 can remain registered with the MSC/VLR 610 serving the calling MS 600, and a double satellite-hop connection can be established (step 760) between the calling MS 600 and the called MS 640, e.g., from the calling MS 600 to the satellite 605 to the SBSS 602 to the satellite 605 and finally to the called MS 640. It should be understood that if there is no conflict (step 735), then the bi-directional path connection is established (step 730).

Figure 8:
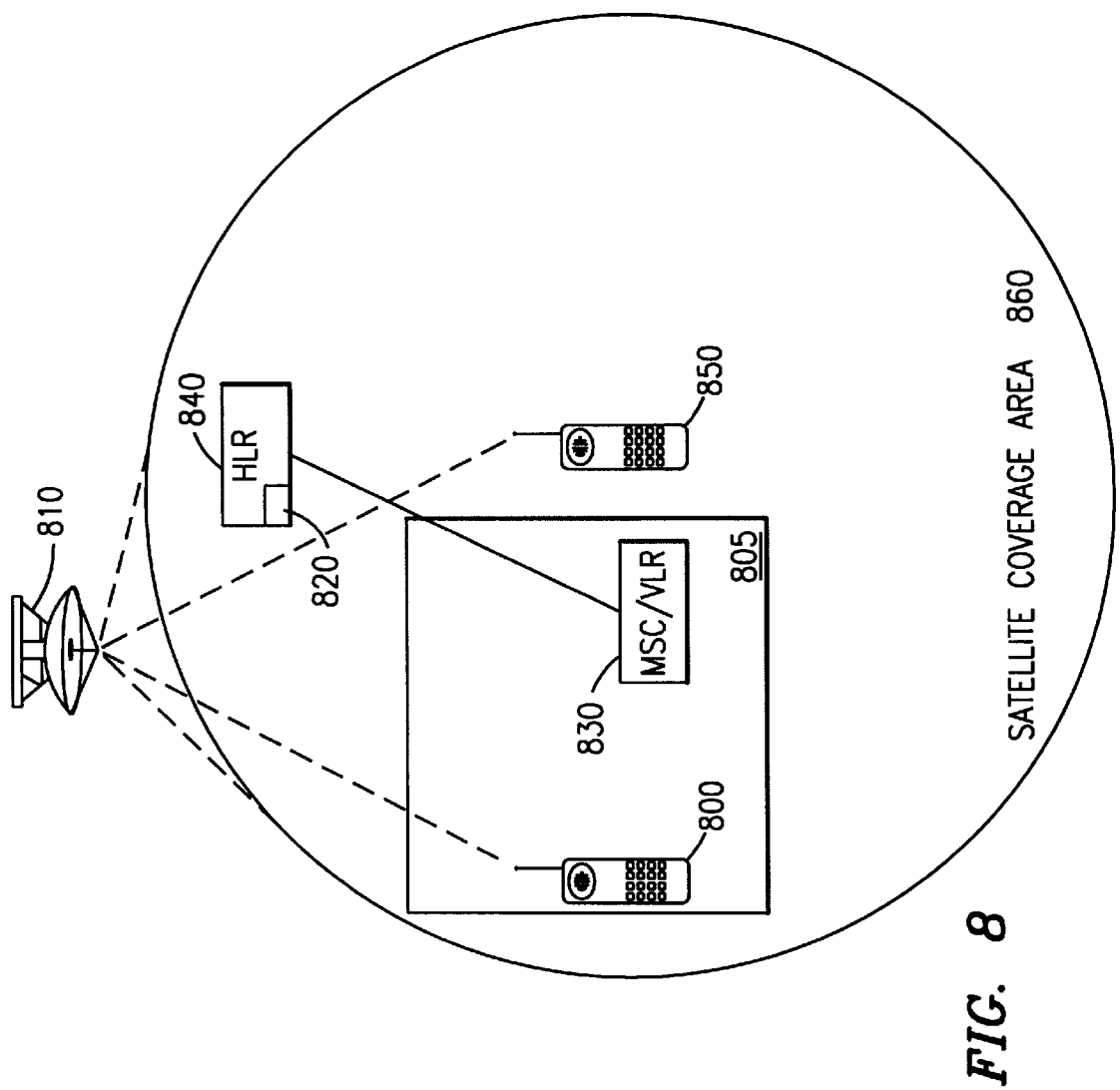
FIG. 8 shows a subscriber-defined list of called mobile subscribers for which either supplementary services or optimization is preferred.

In a further alternative embodiment, as indicated in FIG. 8 of the drawings, the calling MS 800 can establish a list 820 of numbers associated with subscribers with whom the calling subscriber would want either a bi-directional path connection or supplementary services to be available, depending upon the default parameters of the network operator. This list 820 can be stored in the HLR 840, which then sends this list 820 to the MSC/VLR 830 serving the location area 805 that the MS 800 is located in when the MS 800 registers with the serving MSC/VLR 830. Therefore, when the MS 800 attempts to place a call to another MS 850 within the satellite coverage area 860, before optimization, the MSC/VLR 830 analyzes the called party number and compares it with the list 820 of numbers to determine whether the calling MS 800 prefers optimization or not. If optimization is selected, the called MS 850 receives a message with the ringing of the call via the satellite 810 indicating that optimization will occur. Therefore, the called MS 850 can choose to not answer the call if optimization will interfere with supplementary services associated with the called MS 850.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for optimizing a call between a calling one of a plurality of mobile terminals and a called one of said mobile terminals within a satellite network, said telecommunications system comprising:

a mobile switching center in wireless communication with said calling mobile terminal via a satellite, said calling mobile terminal having a keypad thereon adapted to receive a service code, said service code being sent from said calling mobile terminal to said mobile switching center; and a home location register connected to said mobile switching center, said home location register storing supplementary service information associated with said calling mobile terminal, said supplementary service information being sent to said mobile switching center;

wherein said mobile switching center optimizes said call when said service code is set to optimize without regard to whether said supplementary service information associated with said calling mobile terminal interferes with optimization of said call;

wherein said mobile switching center does not optimize said call when said service code is set to supplementary services regardless of whether said supplementary service information associated with said calling mobile terminal interferes with optimization of said call.

2. The telecommunications system of claim 1, wherein an optimization message is sent from said mobile switching center to said called mobile terminal when said call is being optimized.

3. The telecommunications system of claim 1, wherein said call is optimized when said called mobile terminal registers with said mobile switching center and a connection between said calling mobile terminal and said called mobile terminal is established through said satellite.

4. The telecommunications system of claim 1, wherein said supplementary service information is selected from the group consisting of: call waiting, call transferring, multi-party calling, and Short Message Service.

5. A method for optimizing a call between a calling one of a plurality of mobile terminals and a called one of said mobile terminal within a satellite network, said method comprising the steps of:

entering, on a keypad of said calling mobile terminal, a service code associated with said call;

transmitting, by said calling mobile terminal, said service code from said calling mobile terminal to a mobile switching center in wireless communication with said calling mobile terminal via a satellite;

accessing, by said mobile switching center supplementary service information associated with said calling mobile terminal, said supplementary service information being stored within a home location register connected to said mobile switching center;

optimizing said call, by said mobile switching center, when said service code is set to optimize regardless of whether said supplementary service information associated with said calling mobile terminal interferes with optimization of said call; and not optimizing said call, by said mobile switching center, when said service code is set to supplementary services regardless of whether said supplementary service information interferes with optimization of said call.

6. The method of claim 5, further comprising, after said step of selecting, the step of:

sending, by said mobile switching center, an optimization message to said called mobile terminal when said call is being optimized.

7. The method of claim 5, wherein said call is optimized by said called mobile terminal registering with said mobile switching center, optimization of said call establishing a connection between said calling mobile terminal and said called mobile terminal through said satellite.

8. The method of claim 5, wherein said supplementary service information is selected from the group consisting of: call waiting, call transferring, multi-party calling, and Short Message Service.

9. A telecommunications system for selectively optimizing a call between a calling one of a plurality of mobile terminals and a called one of said mobile terminals within a satellite network to enable implementation of supplementary services associated with both said calling and called mobile terminals, said telecommunications system comprising:

a mobile switching center in wireless communication with said calling mobile terminal via a satellite, said mobile switching center being adapted to receive a first priority indicator associated with said calling mobile terminal and a second priority indicator associated with said called mobile terminal, said mobile switching center being further adapted to optimize said call when both said first and second priority indicators are set to optimize.

10. The telecommunications system of claim 9, further comprising.:

a home location register connected to said mobile switching center for storing said first priority indicator associated with said calling mobile terminal and said second priority indicator associated with said called mobile terminal, said first and second priority indicators being sent from said home location register to a visitor location register connected to said mobile switching center.

11. The telecommunications system of claim 9, wherein said first priority indicator associated with said calling mobile terminal and said second priority indicator associated with said called mobile terminal are sent by said calling and called mobile terminals, respectively, to said mobile switching center in first and second classmark information, respectively.

12. A method for selectively optimizing a call between a calling one of a plurality of mobile terminals and a called one of said mobile terminals within a satellite network to enable implementation of supplementary services associated with both said calling and called mobile terminals, said method comprising the steps of:

placing, by said calling mobile terminal, said call to said called mobile terminal;

receiving, by a mobile switching center in wireless communication with said calling mobile terminal via a satellite, a first priority indicator associated with said calling mobile terminal and a second priority indicator associated with said called mobile terminal; and optimizing said call, by said mobile switching center, when both said first priority indicator and said second priority indicator are set to optimize.

13. The method of claim 12, further comprising the step of:

storing, within a home location register connected to said mobile switching center, said first priority indicator associated with said calling mobile terminal and said second priority indicator associated with said called mobile terminal.

14. The method of claim 12, further comprising the steps of:

sending, by said calling mobile terminal, said first priority indicator to said mobile switching center in a first classmark information; and sending, by said called mobile terminal, said second priority indicator to said mobile switching center in a second classmark information.

* * * * *